May 26, 1964 R. C. PARSONS ETAL 3,134,935
SEMI-CONDUCTOR DEVICE COMPRISING TWO ELONGATED
SPACED APART BUS ELECTRODES
Filed Sept. 6, 1961 2 Sheets-Sheet 1
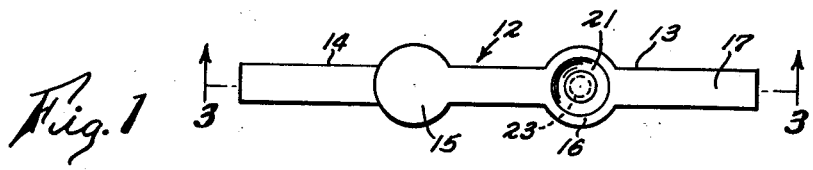
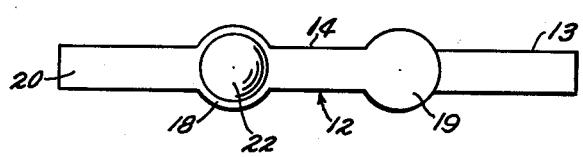
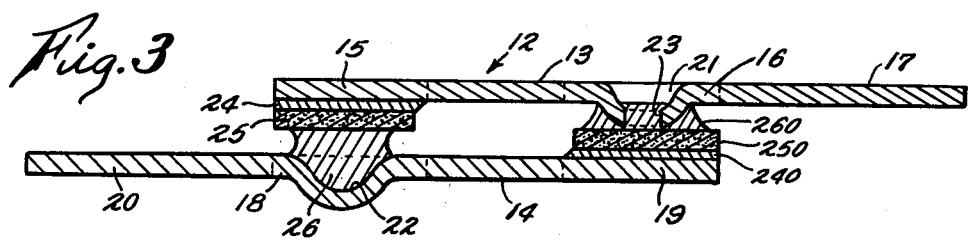
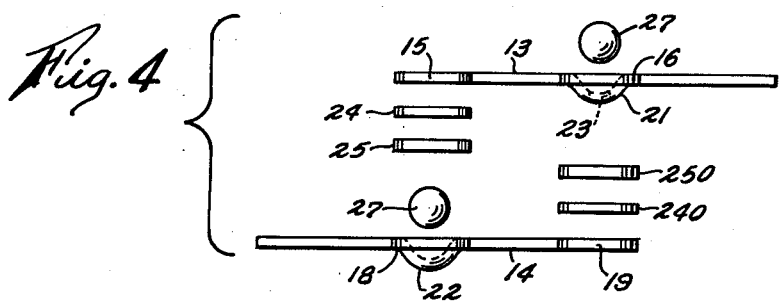
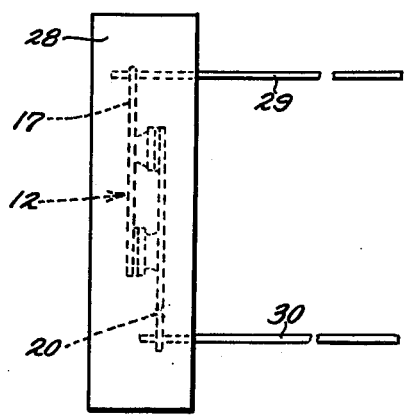
INVENTORS
Robert C. Parsons
Gordon L. Nord
BY
ATTY.

May 26, 1964  R. C. PARSONS ETAL  3,134,935
SEMI-CONDUCTOR DEVICE COMPRISING TWO ELONGATED
SPACED APART BUS ELECTRODES
Filed Sept. 6, 1961 2 Sheets-Sheet 2

INVENTORS
Robert C. Parsons
BY Gordon L. Nord

ATTY.

United States Patent Office 3,134,935
Patented May 26, 1964

3,134,935
SEMI-CONDUCTOR DEVICE COMPRISING TWO ELONGATED SPACED APART BUS ELECTRODES
Robert C. Parsons and Gordon L. Nord, both of Cincinnati, Ohio, assignors to Schauer Manufacturing Corp., Cincinnati, Ohio, a corporation of Ohio
Filed Sept. 6, 1961, Ser. No. 137,472
3 Claims. (Cl. 317—234)

The present invention relates to improvements in the structures of alloyed, semi-conductor devices including the method of manufacturing such devices and their attendant circuitry; the invention being particularly directed to symmetrical and opposed semi-conductors known as non-linear resistances or varistors. These improvements are also applicable and useful in center tap, doubler or full wave bridge electrical circuitry.

At the present time alloyed semi-conductors are for the most part individually manufactured and subsequently connected in a circuit by solder or welding techniques or by pressure type contacts. The fabrication processes for these semi-conductors and their circuitry involve many manual steps principally due to the minute sizes of the various and fragile parts of the semi-conductors, the necessity for absolute cleanliness in carrying out said processes and orientation of the parts electrically. After an alloying step our novel varistor has all the circuit connections completed and the tab type extensions on the bus electrodes are sufficiently flexible and rugged so that conventional lead attachment techniques may be used, such as those carried out on automatic welding machines. Another aspect of the present invention is the provision of a controlled method for mass producing alloyed semi-conductors of the class described that will secure a high yield of semi-conductor devices having the required electrical characteristics.

Another object of the invention is to provide a fabricating method for producing alloyed semi-conductors and their attendant circuitry which includes the utilization of a multiplace jig or fixture into which the individual parts of the semi-conductors and their bus electrodes are quickly assembled and in which the assembled parts are operatively held for fusion.

A further object of the invention is to provide an improved alloyed semi-conductor construction and circuitry which is susceptible of fabrication by the method of manufacture referred to hereinbefore.

A still further object of the invention is to provide a semi-conductor device and attendant circuitry which is small in size and weight and which will permit during the alloying step in their manufacture the fabrication of a plurality of circuits that may be made either vertically or longitudinally in a jig without subsequent connection problems.

These and other objects of the invention will be more fully understood from the following specification when read in conjunction with the accompanying drawings, in which:

FIG. 1 is a top plan view of one alloyed semi-conductor device and its attendant circuitry made in accordance with our invention.

FIG. 2 is a bottom plan view of the semi-conductor device shown in FIG. 1.

FIG. 3 is an enlarged section taken on line 3—3 of FIG. 1.

FIG. 4 is an exploded, side-elevational view illustrating the arrangement of parts that produce the semi-conductor device and circuitry shown in FIGS. 1–3 of the drawings.

FIG. 5 is an elevational view of a complete encapsulation of the semi-conductor device and attendant circuitry shown in FIGS. 1–4 of the drawings.

Figure 6:
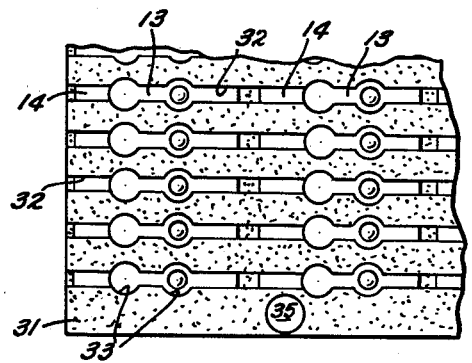
FIG. 6 is a fragmental, top plan view of one corner portion of a fusing jig employed in our method of making a semi-conductor.

With particular reference to FIGS. 1–5 of the drawing the numeral 12 indicates generally a novel alloyed, semi-conductor and its circuitry fabricated by our improved manufacturing process that will be described fully hereinafter, said semi-conductor device being of the small area, symmetrical, non-linear varistor type. The varistor device 12 comprises a first bus electrode 13 and a second bus electrode 14 located in spaced relation beneath the first bus electrode. The bus electrodes are preferably stamped from a sheet of refractory metal such as tantalum and, as shown in FIG. 1, the first bus electrode has a pair of longitudinally spaced apart, planar, disk-shaped portions 15 and 16 formed thereon, the portion 15 being located at one end of the first bus electrode, while the portion 16 is located intermediate the ends of said bus electrode to thereby provide an extended connecting portion 17 on the end of the bus electrode that is opposed to the end planar portion 15. The second bus electrode 14 (FIG. 2) has the identical shape of the first bus electrode but is faced in the opposite direction so that the spaced apart, disk-shaped planar portions 18 and 19 of the second bus electrodes are disposed beneath the planar portions 15 and 16, respectively, of the first bus electrode 13, said adjacent planar portions being in confronting, parallel and axial alignment with each other. The connecting extension 20 on the second bus electrode 14 projects in the direction opposite to the direction of the connecting portion 17 for the first bus electrode 13.

With particular reference to FIGS. 1 and 3 it will be noted that at least one planar portion on each of the bus electrodes, such as the portion 16 on the first bus electrode 13 and the portion 18 on the second bus electrode 14, is provided with a centrally located depression or concavity 21 and 22, respectively, and, as best shown in FIG. 3, the depression 21 on the first or uppermost bus electrode 13 has a hole 23 formed through the bottom thereof.

A typical rectifier element or cell is positioned between the vertically aligned planar portions 15 and 18 on the bus electrodes 13 and 14, respectively, such rectifier being represented in the drawing as a junction forming metal disk 24 of aluminum alloyed to the inside face of the planar portion 15 of the first bus electrode, the inside face of the disk being alloyed to the face of a semi-conductor, such as a silicon wafer 25. The opposite face of the silicon wafer 25 is connected to the depression 22 in the planar portion 18 of the first electrode by ohmic contact material 26 fused thereto by our improved process. As shown in FIG. 3 the ohmic contact material 26 has during the fusion step of our process been alloyed to the inside face of the depression 22 and to the confronting face of the silicon wafer 25. Another rectifying element is located between the aligned planar portions 16 and 19 on the bus electrodes 13 and 14, respectively, the element comprising a junction forming metal disk 240 alloyed to the inside face of the planar portion 19 on the second bus electrode 14, the inside face of the said disk being alloyed to a face of a silicon wafer 250. The opposite face of the silicon wafer 250 is connected by ohmic contact material 260 to the depression 21 in the first electrode 13. As best shown in FIG. 3 the ohmic contact material 260 has during the fusion step of our process flowed around the bottom of the depression 21 and through the hole 23 therein thus forming an intimate contact between the bus electrode 13 and the wafer 250. It should be noted that the order of disposition of rectifying materials 240 and 260 with respect to the semiconductor wafer 250 in the second mentioned stack of rectifying elements has been reversed in the first described stack of rectifying elements thereby forming two oppositely poled rectifier elements or cells connected in parallel by the bus electrodes 13 and 14 to provide a varistor circuit.

FIG. 4 is an exploded view showing the disposition of the parts comprising our varistor shown assembled in FIGS. 1–3 of the drawings and it will be noted that the ohmic contact material in its pre-fused state are solid pellets 27 that are preferably spherical and made of pure tin and that said pellets are adapted for deposit in the depressions 21 and 22 formed in the first and second electrodes, respectively. FIG. 5 shows a finished varistor encapsulated in a protective block 28 of insulating, plastic material, it being noted that wire leads 29 and 30 are electrically connected to the connections 17 and 20, respectively, of the varistor device as by welding, or the like.

Figure 7:
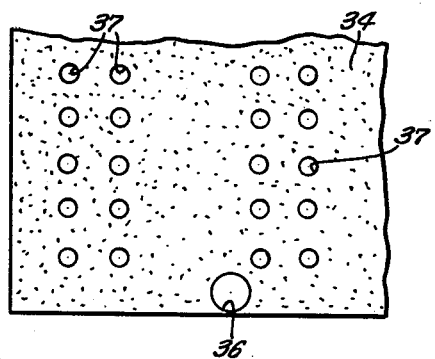
FIG. 7 is a fragmental, top plan view of a cover and weight holder for the jig shown in FIG. 6.
Figure 8:
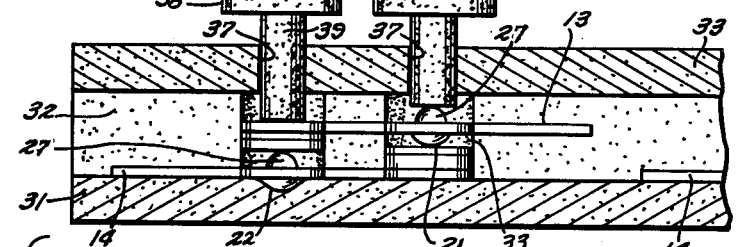
FIG. 8 is a fragmental, enlarged section through the fusing jig as it is readied for heating, the semi-conductor parts and circuitry being shown in side elevation in assembled position within the jig.

The method of fabricating the varistor shown in FIGS. 1–5 of the drawings will be understood best by reference to FIGS. 6, 7 and 8 of the drawings and it will be there noted that the numeral 31 identifies a jig block made of non-fusible material that is inert with respect to the materials used in the manufacture of the various parts of the varistor and which may here be graphite, or the like. The jig block has a series of deep, parallel grooves 32 formed in the upper portion thereof that have a uniform width slightly larger than the body width of the bus electrodes 13 and 14 but narrower than the width of the planar portions thereon. The jig block is also provided with spaced apart wells 33 which correspond in form and spacing to the planar portions 16—16 and 18—19 formed on the electrodes 13 and 14, respectively, of the semiconductor device 12 illustrated in FIGS. 1–5 of the drawings. Into this jig is loaded the several parts of the semiconductor device 12 by consecutively placing them in the order of their positions in the finished device. In other words, and with particular reference to FIGS. 4 and 8, the electrode 14 is first inserted into the bottom of the groove 32 with its planar portions located in the spaced wells 33. Next the two rectifying cells of the varistor are assembled within the spaced wells and upon the planar portions 18 and 19 of the bus electrode 14 by deposit of the pellet 27 in the depression 22, the silicon wafer 25 and junction forming disk 24 being placed in that order upon said pellet. The remaining cell is then assembled by placing the junction forming disk 240 upon the planar portion 19 of the bus electrode 14 and the silicon wafer 250 upon said disk. Next the bus electrode 13 is deposited in the jig block with its planar portions 15 and 16 in the wells in position such that the planar portion 15 rests upon the junction disk 24 and the perforate depression 21 in the planar portion 16 rests upon the silicon wafer 250; and lastly the pellet 27 is placed in the perforate depression 21. The jig block has a great number of varistor receiving stations therein and it is contemplated that a jig may hold as many as two hundred varistors each assembled in the mechanical manner just described. When all the varistors have been mechanically assembled, a cover or lid 34 (FIG. 7) is placed upon the jig block 31 in alignment therewith, said alignment being attained by guide means such as pins 35 on the jig which are receivable in sockets 36 formed in the cover 34. This cover is provided with a number of spaced apart pairs of through-holes 37—37 each holding a graphite weight 38, each weight having a reduced lower end 39 slidable in the hole and an upper enlarged end 40 which rests upon the top surface of the cover when said cover is removed from the block, so that all the weights may be held in operative positions upon the cover when it is removed from the block. When the cover is in place upon the jig block the graphite weights 38 (FIG. 8) are aligned with the rectifier cells by the holes 37 in the top 34 so that the said weights bear downwardly upon the aligned and assembled parts of the rectifying cells.

After the assembly of the jig block with the varistor parts therein the entirety is placed in a conventional fusing furnace equipped with either an inert or reducing atmosphere or a high vacuum and there subjected to temperatures high enough to melt and fluidify the tin pellets 27 and the aluminum disks 24 and 240. The weights 38 maintain a slight pressure on the fusing assembly to control surface wetting of the alloying materials. In the alloying step the fluidified tin in the depression 22 wets the underside of the silicon wafer 25 and the upper surface of said depression 22 and is held by surface tension therebetween in the form shown in FIG. 3 where it is fused to the respective surfaces. The aluminum disks 24 and 240 also melt and are fused to the underside of their respective planar portions and to the confronting faces of the silicon wafers 25 and 250, respectively. The fluid tin 260 in the depression 21 flows through the hole 23 in the bottom thereof and assumes the position shown in FIG. 3 where it is fused to the inside and underside faces of the depression 21 and to the silicon wafer 250 due to wetting of said surfaces and the surface tension of the tin in the fluid state. After complete fusion of the parts the jig is removed from the oven and the varistor assemblage is allowed to cool whereafter the varistors are removed from the jig, leads 29 and 30 welded to their end connections and the alloyed device encapsulated in the plastic block 28.

Figure 9:
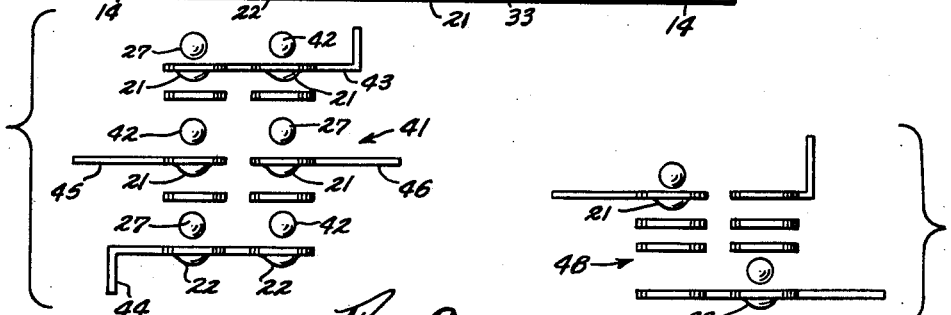
FIGS. 9, 10 and 11 are views similar to FIG. 4 showing various modifications of semi-conductor devices and attendant circuitry produced in accordance with our invention.
Figure 11:
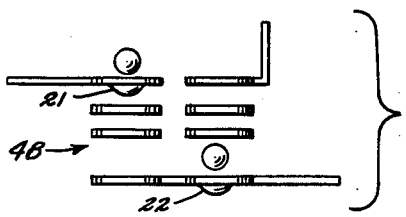
Figure 10:
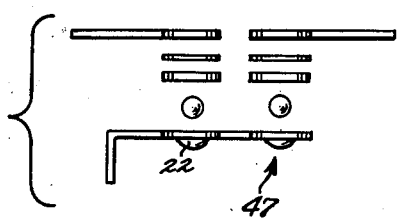

The improved principles and process of this invention may also be utilized to make semi-conductor devices other than the one illustrated in FIGS. 1–8 of the drawings and other exemplary devices are severally shown in FIGS. 9–11. In FIG. 9, for instance, there is shown the order of assembling electrodes, semi-conductor wafers, ohmic contact pellets and junction forming disks into the fusing jig 31 to produce a full wave bridge rectifier circuit 41 such circuit having aluminum pellets 42 and tin pellets 27 arranged as shown; the uppermost bus electrode 43 being provided with a perforate depression 21 in its pair of spaced planar portions whilst the lowermost bus electrode 44 has an imperforate depression 22 formed in its pair of spaced apart planar portions. Electrodes 45 and 46 each have a perforate depression 21 formed in a planar portion thereof. FIGS. 10 and 11 are views similar to FIG. 9 showing the arrangement of jigged parts for, respectively, producing a center tap circuit 47 and a doubler 48 as will be apparent without further explanation.

Whilst tantalum has been specified as the bus electrode material, it is understood that other substances such as molybdenum or tungsten could be employed while well known junction forming metals other than aluminum such as group IIIA and group V metals or alloys thereof could be used with ohmic contact metals other than tin such as silver and lead. Combinations of these metals could also be used in the several parts to provide predetermined electrical characteristics for our finished semi-conductor devices as is well understood in the art.

The foregoing constructions and fabricating method are illustrative of our invention and other arrangements and processes may be devised by those skilled in the art without a departure from the scope of the appended claims.

What we claim is:

1. In a semi-conductor device comprising a pair of elongated spaced apart bus electrode bodies, at least two, longitudinally spaced apart planar portions formed one-piece with each bus electrode body, said planar portions having uniform configurations and projecting laterally from opposite sides of the said bodies, the adjacent planar portions on opposed bus electrodes being disposed in spaced, parallel and confronting relationship, a centrally located ohmic contact receiving depression formed in diametrically opposed planar portions of the bus electrodes, an alloyed rectifier cell positioned between adjacent planar portions; the order of parts in adjacent cells being reversed to provide oppositely poled, rectifying cells between the bus electrodes.

2. In a semi-conductor device comprising a first bus electrode, a second bus electrode disposed beneath said first bus electrode, each of said bus electrodes having a pair of longitudinally spaced apart planar portions formed thereon, said pairs of planar portions being disposed one above the other in spaced, parallel and confronting relationship, a fusible metal pellet, a metal pellet receiving depression formed in diametrically opposed planar portions on the bus electrodes, a metal disc fused to the face of the planar portion confronting the planar portion having the depression, a semi-conductor wafer having one face fused to the disc, and said fusible metal pellet fused to the opposed face of the wafer and to the planar portion having the depression.

3. In a semi-conductor device of the small area, symmetrical varistor type comprising a first bus electrode having a narrow body, a second bus electrode spaced beneath the first bus electrode and having a narrow body, a pair of longitudinally spaced apart planar portions formed on and extending laterally from each bus electrode, the pair of planar portions on the first bus electrode being disposed above and in vertical alignment with the corresponding pair of planar portions on the second bus electrode, a centrally located ohmic contact receiving depression formed in diametrically opposed planar portions on each bus electrode, a hole formed through the depression in the planar portion on the first bus electrode, a junction forming metal disk fused to each of the planar portions opposite the depression carrying planar portions, a semi-conductor wafer fused to each of the junction disks, and ohmic contact materials fused to the opposed faces of the semi-conductor wafers and to the bottoms of the adjacent depressions.

References Cited in the file of this patent

UNITED STATES PATENTS

| | | |
|---|---|---|
| 2,126,067 | Walter | Aug. 9, 1938 |
| 2,462,218 | Olsen | Feb. 22, 1949 |
| 2,530,552 | Stoddard | Nov. 21, 1950 |
| 2,606,955 | Herrick | Aug. 12, 1952 |
| 2,792,537 | Martin | May 14, 1957 |
| 2,819,435 | Connell | Jan. 7, 1958 |
| 2,822,512 | French | Feb. 4, 1958 |
| 2,899,611 | Bradley et al. | Aug. 11, 1959 |
| 2,909,453 | Losco | Oct. 20, 1959 |
| 2,962,639 | Pensak | Nov. 29, 1960 |
| 2,999,173 | Ruck | Sept. 5, 1961 |
| 3,002,133 | Maiden et al. | Sept. 26, 1961 |